J. R. PERRY.

Organ-Reed Boards.

No. 5,954. Reissued June 30, 1874.

*Witnesses.*
C. F. Brown
Melville Church

*Inventor*
J. R. Perry
by his Atty.s.
Hin & Ellsworth

AM. PHOTO-LITHOGRAPHIC Co. N. Y. (OSBORNE'S PROCESS.)

UNITED STATES PATENT OFFICE.

JOSEPH R. PERRY, OF WILKESBARRE, PENNSYLVANIA.

IMPROVEMENT IN ORGAN REED-BOARDS.

Specification forming part of Letters Patent No. 130,239, dated August 6, 1872; reissue No. 5,954, dated June 30, 1874; application filed March 6, 1874.

*To all whom it may concern:*

Be it known that I, JOSEPH R. PERRY, of Wilkesbarre, in the county of Luzerne and State of Pennsylvania, have invented a new and useful Improvement in Reed-Boards for Organs; and I do hereby declare the following to be a full, clear, and exact description of the same, reference being had to the accompanying drawings forming part of this specification.

The object of this invention is to increase the variety and improve the quality of the tones produced by reed-organs; and it consists, first, in combining two sets of reeds and reed-openings, arranged in the usual manner, with a third set of reed-openings, operating to let an additional air current or currents upon the vibrating ends of one of the sets of reeds above referred to; secondly, in a reed-chamber, provided with a longitudinal strip dividing it, so as to produce two currents of air; and, thirdly, in a cross-board, constructed with recesses, which allow the stops to close upon the ends of the reeds.

Figure 1 is an end elevation, showing the reeds *a a* placed in the board *b*, which board includes all within the Figs. 1, 2, 3. The dotted lines indicate the interior shape of the chambers, the portion of the chamber above the solid strips *c c* forming a compound chamber with the one in which the reeds are seen.

This compound chamber may be formed either by adding the upper part to the board from *c c*, or it may be made from a solid board, and the strips *c c* inserted, so as to cut off and divide the air as it passes into the cell, allowing one portion of the air-current to pass over the dividing-strip and strike directly upon one end of the reeds, while the other portion passes under the dividing-strip and strikes directly upon the other end of the same reeds.

In an organ constructed with the two sets of reeds, reed-cells, air-openings, and stops, *i*, J, or the equivalents thereof, I combine, also, a third set of air-openings, arranged so as to admit, at pleasure, an additional current or currents of air. Such additional air-openings are arranged between the front openings and the back openings, and are designed to let the third air current or currents enter the reed-cells and strike directly upon the vibrating ends of the reeds.

A good method of constructing the organ to attain this object is to cut out the board on its upper side, along the middle portion, so as to form a recess, *d*, which communicates, by openings *e*, with the series of air-cells on one or the other or both sides of the recess. In the drawings it is represented as communicating with the back set of reed-cells only. The openings *e* allow an additional air current or currents to enter along that line, pass in the direction of the dotted lines *h h*, and impinge directly upon the vibrating ends of the set of reeds nearest thereto. These additional air-passages are opened or closed, at will, by means of a suitable valve, stop, or mute. As shown in the drawings, the stop consists of a bar, G, suspended by ferrule-joints from a plowed strip, *f*, secured to the top of the reed-board *b*. A stop similar to G may also be placed over the front set of reeds when openings like *e* are provided in connection with that set. The added chamber increases the space over the reeds, affording a much larger quantity of air for the reed to beat in.

The whole reed may be inclosed within the board. This is done by cutting away the cross-board *k*, so as to let the stop close against a rim, *k'*, thus formed, which renders the chambers perfectly air-tight when closed, and prevents the small reeds from singing, which is a difficult thing to do when the stops are closed on the top of the reed-blocks in the usual way.

The portion *l* of frame holds the springs which keep the pallets or valves *m* in place. *n* shows the pin used in operating the valve by the keys in the usual way.

1, but is designed for very heavy reeds, used for sub-bass and pedal-bass.

Figure 1:
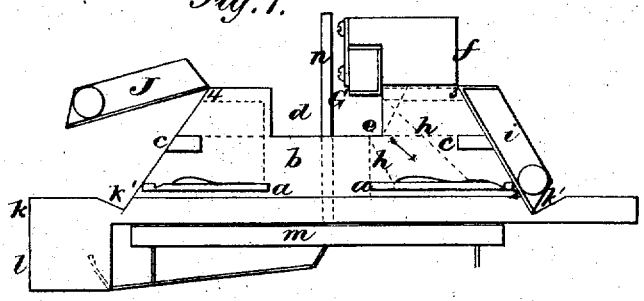
Figure 2:
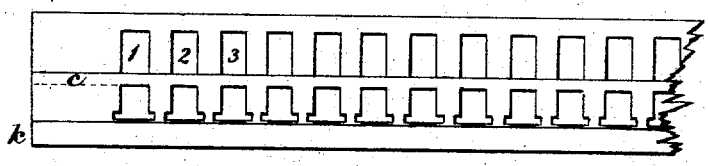
Fig. 2 shows a front view of the reed-board, with the dividing-strip *c*, as above described; and 1, 2, 3, &c., are the reed-chambers. *k* is the cross-board. The deep lines under the reeds at the bottom of each chamber are to show the leather, upon which the reeds slide tightly, so as to exclude air from passing into the bellows beneath them.
Figure 3:
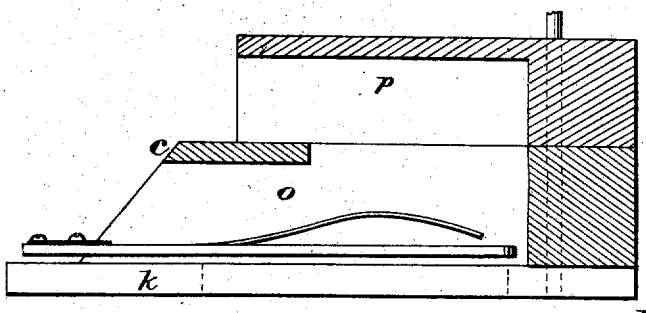
Fig. 3 shows cross-section, exposing the lower chamber *o* and the sub-chamber *p* over it, with the reed running into them, in the usual manner. This is similar to those in Fig.

By cutting the board, as above described, at *c*, so as to throw more air and give more space over the ends of the reeds, they acquire a much stronger tone, and are much more sensitive to the draft of air upon them. The cross-board *k* is seen as in Fig. 1.

By taking in the additional air current or currents through the intermediate openings *e*, and directing such current or currents immediately upon the ends of the nearest set of reeds, a variety of fine effects are readily obtained. For example, by closing the stop *i* and opening the stop G a fine "flute-tone" is produced; and by combining a full or partial opening of *i* with a full or partial opening of G a great variety of modifications is given to the tones. By opening J and G the vox celeste is produced; and this may again be modified almost indefinitely by combining with it air-currents from *i*, as above described.

Having thus described my invention, what I claim is—

1. In combination with the front or back set of reeds and the usual stop for admitting and shutting off the air, the supplementary air-openings, provided with a stop, to admit air directly upon the vibrating ends of the reeds, for the purpose of producing the flute-tone and its modifications, substantially as described.

2. In combination with two sets of reeds, reed-openings, and stops, arranged oppositely, in the usual manner, an additional set or sets of reed-openings and stops, arranged so as to direct an additional air-current or additional air-currents directly upon the vibrating ends of one of the sets of reeds, for the purpose of producing the vox celeste and its modifications, substantially as described.

3. The board *b*, constructed with the recess *d*, exposing the ends of the chambers, which are cut to form a straight line, and combined with the stop G, in the manner described, and for the purpose specified.

4. The chambered board *b*, divided internally by the strip *c*, as and for the purpose described.

5. The cross-board *k*, constructed with recesses *k'*, the inner faces of which are in line with the outer sides of the reed-chambers, so as to allow the stops to close upon the ends of the reeds, as and for the purpose explained.

Witnesses: JOSEPH R. PERRY.
N. K. ELLSWORTH,
MELVILLE CHURCH.